ARTIFICIAL DENTURE

Original Filed April 17, 1951 4 Sheets-Sheet 1

INVENTOR.
ROBERT J. DONAVAN,
BY
McMorrow, Berman + Davidson
ATTORNEYS

ARTIFICIAL DENTURE

Original Filed April 17, 1951 4 Sheets-Sheet 2

INVENTOR.
ROBERT J. DONAVAN,
BY
McMorrow, Berman & Davidson
ATTORNEYS.

ARTIFICIAL DENTURE

Original Filed April 17, 1951 4 Sheets-Sheet 3

INVENTOR.
ROBERT J. DONAVAN
BY
McMorrow, Berman & Davidson
ATTORNEYS.

ARTIFICIAL DENTURE

Original Filed April 17, 1951 4 Sheets-Sheet 4

INVENTOR.
ROBERT J. DONAVAN,
BY
McMorrow, Berman & Davidson
ATTORNEYS.

Reissued Dec. 30, 1952

Re. 23,607

UNITED STATES PATENT OFFICE 23,607

ARTIFICIAL DENTURE

Robert J. Donavan, Mason City, Ill.

Original No. 2,598,769, dated June 3, 1952, Serial No. 221,415, April 17, 1951. Application for reissue November 4, 1952, Serial No. 318,773.

10 Claims. (Cl. 32—2)

Matter enclosed in heavy brackets [ ] appears in the original patent but forms no part of this reissue specification; matter printed in italics indicates the additions made by reissue.

This invention appertains to improvements in artificial dentures, either anatomical or mechanical, and has reference more particularly to the construction of false teeth as used in artificial dentures, either in the form of a whole plate, partial plate or bridgework.

The primary object of this invention is to provide artificial dentures, which have approximately the same grinding and cutting efficiency for food mastication as that of natural teeth, due to the design and construction of the occlusal surfaces of the molars and bicuspids.

A further object of this invention is to obtain maximum cuspal or ridge contact between the occlusal surfaces of the posterior teeth of the upper and lower dentures, the maximum contact permitting proper mandibular movements (anterior-posterior and lateral excursions) with a minimum of cuspal interference.

A further object of this invention is to improve the cutting and grinding efficiency of the occlusal surfaces of the teeth of artificial dentures by providing unique mechanisms on the occlusal surfaces of the molars and bicuspids and by providing a more extensive horizontal occlusal surface for the posterior teeth.

A further object of this invention is to provide armoured cusps on the occlusal surfaces of the posterior teeth, the armoured occlusal surfaces reducing to a minimum the wearing away and breakdown of the occlusal surfaces of the teeth and preventing loss of vertical dimension, especially in plastic teeth, while also preventing the chipping of the teeth or breaking up of portions of the cuspal walls, especially in porcelain teeth.

Still further objects of the present invention reside in the details of construction of the individual teeth and in the construction and relationship of the occlusal surfaces of the upper and lower posterior teeth which insures their greatest biting and masticating efficiency, and the least possible liklihood of cuspal interference, incident chipping of the teeth or displacement of the plates from proper position within the mouth and prevents an imposition of deleterious strain on the mucous tissues or imposition of direction upon the mandibular motion.

These and ancillary objects and structural features of merit are attained by this invention, the preferred embodiments of which are set forth in the following description and illustrated in the accompanying drawings, wherein:

Figures 14, 14a and 14b are cross-sectional views, illustrating in diagrammatic form the relationship between the upper and lower dentures, when in position in the oral cavity and during masticating movements to depict the relationship between the occlusal surfaces, during mandibular motion, the dentures being shown in concentric, protrusive and extrusive positions;

Figure 1:
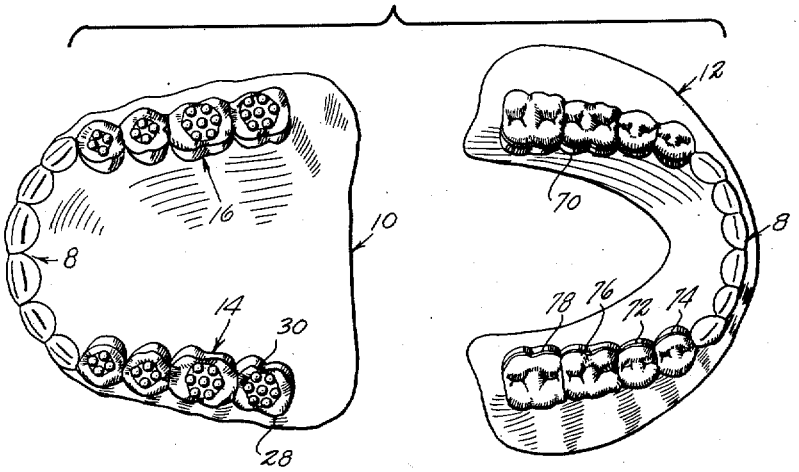
Figure 1 is an occlusal surface view of upper and lower artificial dentures including teeth constructed in accordance with the principles of the present invention.
Figure 2:
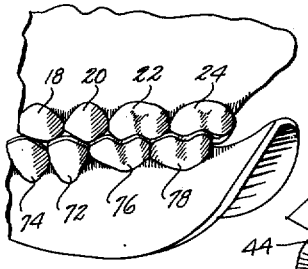
Figure 2 is a fragmentary perspective view of the posterior portions of one side of the upper [and lower dentures, from the lingual side with] *and lower dentures, from the buccal side with* the dentures in occlusive relationship.

For a more lucid understanding of the present invention, it will be generally recognized that artificial or "false" teeth, in the form of the whole denture or plate, are relatively low in efficiency for the mastication of food, when compared with the high degree of efficiency of the full set of natural teeth. The comparative low efficiency of the average set of dentures is essentially due to the anatomical aspect of the teeth, since, for esthetic reasons, those skilled in the prosthetic art have made false teeth to resemble as nearly as possible natural ones. In the provision of such false teeth, insufficient consideration is extended to the efficiency of the teeth during mastication of food. Whereas natural teeth are securely set in the bony structure of the jaw and, therefore, have a very high pressure range artificial teeth, on the other hand, must find their bearing surfaces upon the tender mucous tissues instead of in the bony tissues and do not have a firm anchorage in the mouth. The limitations in affording proper bearing surfaces for the artificial teeth prevent the attaining of high masticating pressures.

Since artificial dentures must occupy the same position, as nearly as possible, in the oral cavity, it is obvious that any increase in efficiency must necessarily come through an improvement in the design of the occlusal surfaces of the teeth, so that the artificial dentures may find their greatest efficiency in a grinding and cutting engagement of the occlusal surfaces.

Any improvements of the cutting edges and occlusal surfaces of the artificial teeth must necessarily be limited to the posterior teeth, due to the fact that the anterior teeth are visible to the casual glance of a layman and, for esthetic reasons, should have a natural appearance. Furthermore, the posterior teeth are of greater importance in the mastication of food than the anterior teeth and the improvement therein to increase grinding or crushing efficiency of the teeth with a more natural movement of the mandible or jaw is the primary purpose of the instant invention.

In accordance with the object of the instant invention, the cutting edges of the posterior [teeth or the dentures are improved, while con-] *teeth of the dentures are improved, while con*sideration is also extended to the prevention of interference between the occlusal surfaces of teeth of the opposite dentures and to the obviation of interference with mandibular motion. It is, therefore, the primary aim and purpose of the instant invention to provide substantially the same grinding and cutting efficiency as that of natural teeth for food mastication by improving the design and construction of the molars and bicuspids of the artificial dentures.

As can be appreciated, it impossible to establish fixed paths of movement for mandible action, since the actions of the mandible during mastication vary considerably in each person. In each individual, the paths of motion of the mandible are controlled by various factors and artificial dentures must be constructed to conform to the corresponding path of movements, rather than to set up and establish a radically different path of movement, which, of course, would result in considerable interference with the mandibular action and would cause deleterious strain on the jaws and gum tissues. The artificial dentures, provided by this invention, do not interfere with the movement of the mandible anteriorly, posteriorly or laterally at any angle, though a slight interference with the mandibular is encountered in a downward slanting motion, in its lateral movements. However, the latter interference is natural and does not work any strain on the mandible.

The foregoing object is accomplished by providing a multiplicity of cuspal and ridge contacts, the mandible moving freely, without being locked by inclined planes of opposing cusps or guided into preconceived paths by grooves or other mechanical devices on occlusal surfaces.

More specifically, the number of cusps on the premolars and molars of the upper dentures or plates are increased and the cuspal and ridge design of the bicuspids and molars of the lower plates are changed and extensively modified, especially with reference to the provision of a novel bucco-lingual ridge structure. Furthermore, the cusps of the upper multi-cusp teeth are of rounded, partly globular form and the arrangement is modified so that sliding contact with the occlusal surfaces of the lower posterior teeth can be effected.

Referring now more particularly to the drawings, attention is directed to Figure 1, where the [upper and lower plates for dentures are illus-] *upper and lower plates or dentures are illus*trated in plan view, the dentures having teeth set therein which are made in accordance with the details and objects of the present invention. The upper plate 10 and the lower plate 12 may be molded in the usual manner, and may be formed of any of the materials now in general use and the teeth which are set in plates may be of porcelain, or a molded material, such as "acrylic" or any other plastic, which would be satisfactory from a point of durability, efficiency, color and capability of being molded to desired shapes.

The manner of forming the plates and teeth is immaterial, except that the teeth should be permanently united with the plates, so as to avoid any possibility of their displacement therefrom in use and the teeth should, of course, be set in accordance with the natural tooth arrangement of the patient, the size and shape of the teeth being determined thereby.

Figure 3:
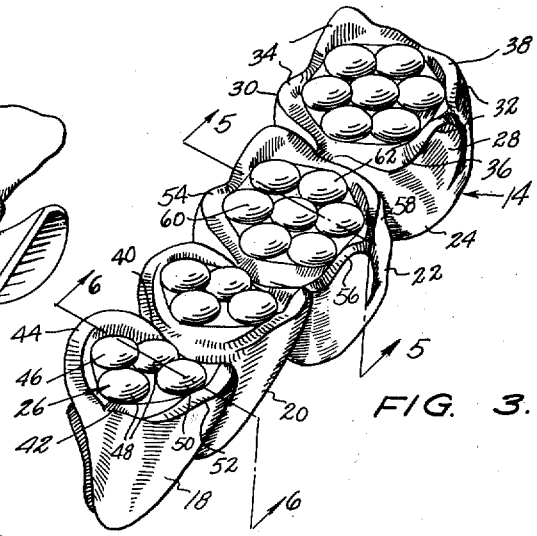
Figure 3 is an enlarged perspective view of the posterior teeth on one side of the upper denture with the teeth shown in inverted position.

In Figure 3, the occlusal surfaces for the bicuspids and molars of the upper plate 10 is illustrated in detail, the occlusal surfaces of the posterior teeth 14 and 16 of the upper plate being modified and being designed and constructed in view of the same principle. The anterior teeth 8 may be formed in the conventional manner and should resemble, as nearly as possible, the natural teeth of the patient.

The occlusal surfaces of the first bicuspid 18 and the second bicuspid 20 are similarly formed, as are the occlusal surfaces of the first molar 22 and the second molar 24. The occlusal surfaces of these teeth are so constructed as to contain a group of mechanical semi-globular or semi-cylindrical cusps 26. In Figure 3, four cusps are provided for the bicuspids 18 and 20 and seven cusps for the first and second molars 22 and 24. However, any number of cusps may be formed, dependent upon the size of the area or space containing the cusps and the size of the cusps. The number or size of the cusps is not of critical importance but the shape and specific formation and arrangement thereof on the crown of the teeth constitutes one of the important aspects of this invention.

The area containing the cusps is defined on the buccal side 28 and on the lingual side 30 by buccal cusps 32 and lingual cusps 34, which are of natural design. From the buccal and lingual aspects, the buccal and lingual surfaces present the same contours, grooves, elevation and angles as natural teeth. On the mesial and distal sides, the molars are defined by the mesial marginal border 36 and distal marginal border 38; the bicuspids being similarly formed with distal marginal borders 40 and mesial marginal borders 42. The mesial and distal marginal borders of both the bicuspids and molars are so constructed as to be well below the tips of the cusps 26.

The occlusal surfaces of the bicuspids 18 and 20 are defined by the lingual cusps 44, the lingual mechanical cusps 46, the central mechanical cusps 48, the buccal mechanical cusps 50 and the conventional buccal cusps 52. The semi-globular cusps 26 are so arranged that the lingual mechanical cusp 46 lies adjacent to the lingual cusp 44 and the buccal mechanical cusp 50 is disposed adjacent to the conventional buccal cusp 52, the cusps 46 and 50 being in a position so that they are intersected by the bucco-lingual ridge. The natural cusps 44 and 52 and the mechanical cusps, grouped in a specifically arranged pattern within the natural buccal and lingual cusps, are so arranged that when viewed from either the mesial or distal side of the tooth, the buccal cusps 52 are of the greatest height, with the conventional lingual cusp 44 being next in height. The buccal mechanical cusp 50 is third highest, with the lingual mechanical cusp being fourth in height and the central mechanical cusps 48 lying well below the plane of the tips or crests of the buccal and lingual mechanical cusps 50 and 46.

Figure 6:
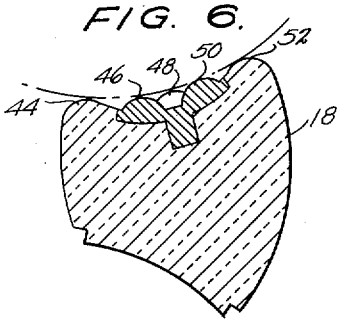
Figure 6 is a transverse cross sectional view taken on line 6—6 of Figure 3 and illustrating in cross section the first bicuspid the cuspal and ridge formation being shown in detail.

The elevation or arrangement of the cusps can be particularly discerned from Figure 6, wherein it will be noted that the conventional buccal cusp 52 is substantially higher than the conventional lingual cusp 44, with the buccal mechanical cusp 50 lying below the conventional buccal and lingual cusps and lying above the lingual mechanical cusp 46, which extends above the central mechanical cusp 48.

Figure 5:
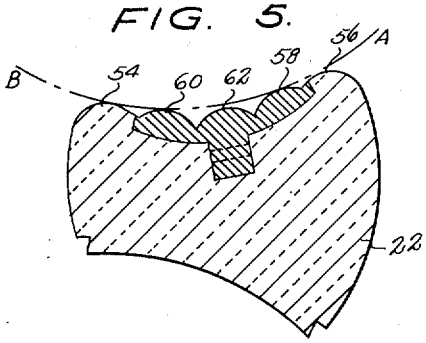
Figure 5 is a transverse cross sectional view taken on line 5—5 of Figure 3 and illustrating the first molar in cross section to more particularly depict the cuspal arrangement and formation of the occlusal surface.

The occlusal surfaces of the molar are constructed in a similar manner, in that the lingual cusps 54 and buccal cusps 56 are substantially conventional in formation, the conventional buccal cusps being the highest cusps on the occlusal surface of the molars and lying above the lingual cusps 54, as seen in Figure 5. The pair of buccal mechanical cusps 58, are next in height and lie below the lingual and buccal cusps. The lingual mechanical cusps 60 are formed in a manner similar to the formation of the buccal mechanical cusps 58 and lie below the plane of the buccal mechanical cusps, the cusps 58 and 60 following the slanting pattern of the conventional lingual and buccal cusps and being arranged with the central mechanical cusps 62, which are the lowest cusps on the occlusal surface, so that the tips of the cusps lie on the arc A—B, viewed from the distal side of the tooth and the line A—B being struck along the bucco-lingual ridge. Similarly, the tips of the cusps for the bicuspids, as seen in Figure 6, lie so that they are in an arcuate pattern.

Figure 13:
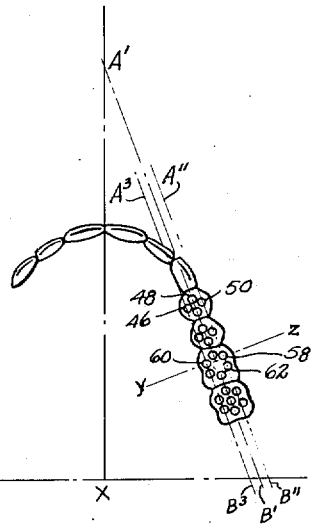
Figure 13 is a fragmentary occlusal surface view of one side of the upper denture.

As seen in Figure 13, the cusps of the premolars and the molars are arranged, so that the [buccal mechanical cusps of the molars and bicuspids are intersected by a straight line A′—B′, which is extended in a distal-mesial direction. The central mechanical cusps are intersected by a line A″—B″, which parallels the line A′—B′] *buccal mechanical cusps of the molars and bicuspids are intersected by a straight line A″—B″ which is extended in a distal-mesial direction. The central mechanical cusps are intersected by a line A′—B′, which parallels the line A″—B″*, and the lingual mechanical cusps of the molars and biscuspids lie on a line $A^3$—$B^3$. The lingual, buccal and central mechanical cusps are thus arranged along straight parallel lines, A′—B′, A″—B″ and $A^3$—$B^3$, the parallel lines being in relation to the anterior-posterior motion of the mandible and showing the arrangement of the mechanical cusps in relation to anterior-posterior motion, from the arch X. The position of the plate, as illustrated in Figure 13, in the oral cavity will position the mechanical cusps along straight spaced apart lines which are substantially parallel to each other, the intersecting lines Y—Z showing the arrangement of the cusps for lateral motion.

Figure 12:
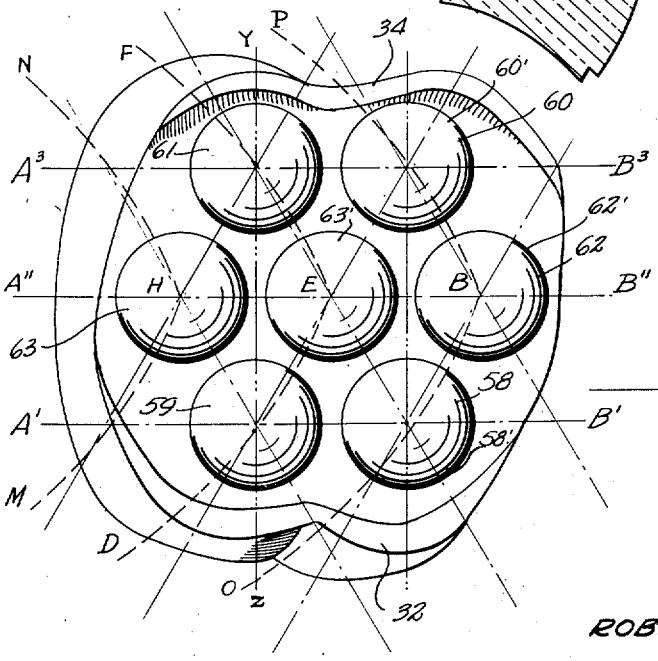
Figure 12 is an occlusal surface view on an enlarged scale of one of the molars of the upper denture, illustrating in detail the arrangement and formation of the cusps.

In Figure 12, the occlusal surface of the molars, is more clearly illustrated, the buccal mechanical cusps 60 being formed in a pair 60′, 61. Each of the cusps of the pair is spaced apart and is of the same height, the height of the cusps, in relation to the other mechanical cusps, being greater, while the three central mechanical cusps 62 are the lowest, on the occlusal surface. The central mechanical cusps 62, 63 and 63′ are of the same height, with the lingual mechanical cusps 58′ and 59 being slightly above the central cusps 62 and slightly below the buccal cusps 60. The buccal cusps are arranged in a pair, each of the cusps being aligned from a bucco-lingual direction, with the lingual mechanical cusps.

The cusps 58′, 60′ and 62′ of the buccal, lingual and central mechanical formations form an arcuate broken ridge O—P, on the mesial side of the tooth, while the cusp 63 forms with the distal marginal border, a broken arcuate ridge M—N, the center H and B of the ridges being in alignment on the line A″—B″, which parallels the anterior-posterior direction of movement of the mandible. The cusps 59, 63′ and 61 form a broken ridge D—F, with the center E on the line A″—B″ and the centers of the ridges being at the centers of the central mechanical cusps. The cusps of the bicuspids and the molars, as depicted in Figure 13, lie on the parallel straight lines and the cusps of each individual tooth are disposed on the arcuate lines to define the broken ridges across the occlusal surface of the tooth. The tips of crests of the cusps make sliding contact with the occlusal surfaces of the lower posterior teeth and carry the weight of occlusal contact and mandibular movement, (lateral, anterior and posterior) in all directions and at all angles, without forcing the mandibular into any preconceived paths.

Figure 15:
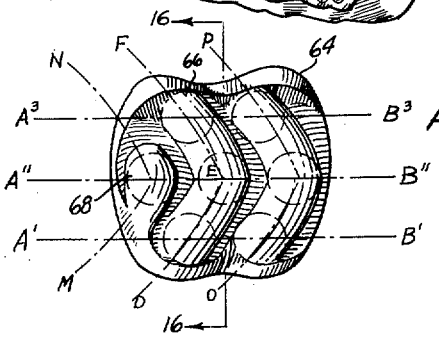
Figure 15 is an occlusal surface view of a posterior tooth of the upper denture having a modified form of cusp arrangement.
Figure 10:
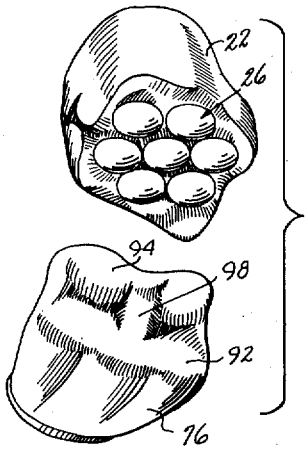
Figure 10 is an enlarged perspective view of the mating occlusal surfaces of the molars of the upper and lower artificial dentures.

In Figure 15, a modified cusp formation is illustrated, wherein the ridges 64, 66 and 68, lying on the arcs OBP, DEF and MHN, are unbroken. The individual cusps are illustrated in dotted lines but the ridges are unbroken instead of broken, as in Figure 12. A tooth, constructed as illustrated in Figure 15, would make the mandibular movements smoother and would have a better sliding engagement with the occlusal surfaces of the lower posterior tooth, due to the absence of sulci between the individual cusps and extending from the mesial to the distal side. All of the posterior teeth of a denture could be constructed in this manner or only the first molar may be so constructed, the first molar forming the bearing tooth for the teeth. The specified height relationship of the mechanical and conventional lingular and buccal cusps would be, of course, preserved, with the portions of the ridges, lying between the cusps conforming thereto.

Figure 16:
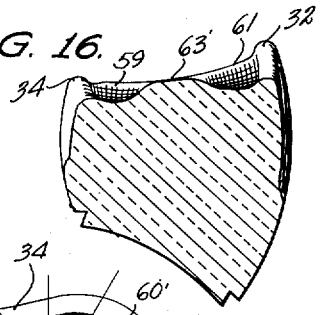
Figure 16 is a transverse cross sectional view taken on line 16—16 of Figure 15.

As seen in Figure 16, which is a cross sectional view of Figure 15 looking toward the distal side of the molar, the ridge 66 is defined by the cusps of the central mechanical, lingual mechanical and buccal mechanical sets, with the spaces between the cusps filled in and properly dimensioned and leveled, so as to retain the same elevational relationship between the cusps, as illustrated in Figure 5. Thus, the cusps 61, 63' and 59, which lie on the line DEF, are in the same elevational interrelationship and relationship [with the conventional buccal cusps 34 and conventional lingual cusps 32] *with the conventional buccal cusps* 32 *and conventional lingual cusps 34.*

Figure 11:
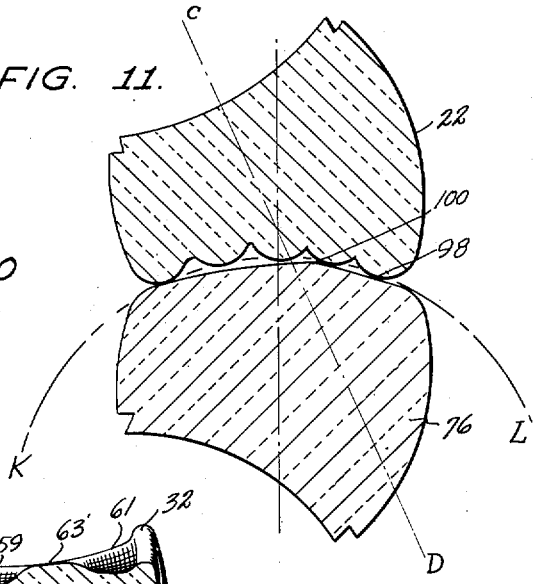
Figure 11 is a transverse cross sectional view, showing more particularly the engagement between the cusps of the upper and lower molars.

In Figure 11, the upper molar 22 is shown in cross section, from a line transverse to the anterior-posterior direction of movement of the mandible and the arrangement of the cusps, with respect to the buccal surface of the molar on the lower denture can be ascertained, the line C—D showing the inclination of the upper and lower teeth, from the vertical plane.

Figure 4:
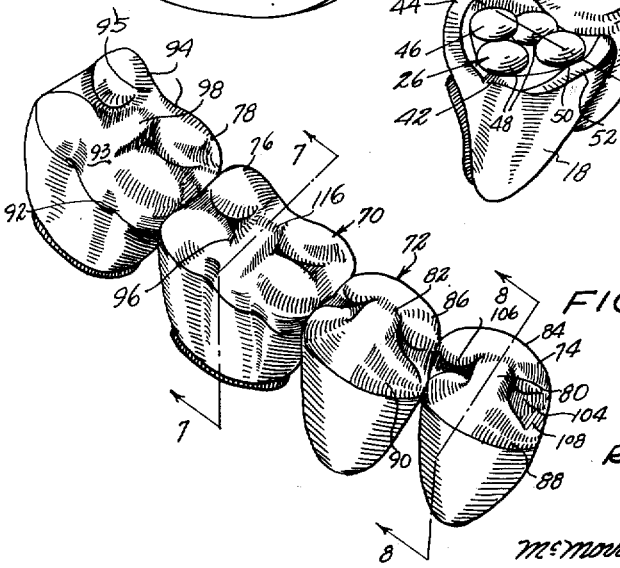
Figure 4 is an enlarged perspective view of the posterior teeth on one side of the lower denture.

Attention is now directed to Figure 4 and the sectional illustrations, taken from Figure 4, wherein the posterior teeth 70 of the lower denture are illustrated, including the pair of premolars or bicuspids 72 and 74 and the first and second molars 76 and 78. The occlusal surfaces of the lower bicuspids and molars have been designed and constructed for proper engagement without cuspal or ridge interference, with the cusps on the posterior teeth of the upper denture or plate. The bicuspids 72 and 74 are formed bucco-lingually by massive sized bucco-lingual ridges 80 and 82, the ridges being of a size to substantially span the spaces between the tips or crests of the multi-cusps on the occlusal surfaces of the upper posterior teeth, so that a smooth and yielding passage to the mandibular action is provided. The bicuspids and molars of the bottom plate or denture, when viewed from a buccal or lingual direction, present the same contours, grooves, elevation and angles as a natural tooth. The first and second bicuspids 74 and 72 are formed with the distinct lingual cusps 84 and 86 and with distinct buccal cusps 88 and 90, all of the cusps being blunt and massive. There are no high or sharp points on the cusps, the wear surface of the cusps being rounded or rolled, as [seen in Figure 8. The lingual cusps 82 and 84] *seen in Figure 8. The lingual cusps 86 and 84* are reduced in size as compared with the buccal cusps 88 and 90.

The buccal cusps 92 and the lingual cusps 94 on the first and second molars are defined by the buccal and lingual grooves and depressions on the buccal and lingual surfaces, with the lingual cusps being reduced in size as compared with the buccal cusps. Both the buccal and lingual cusps are formed so as to merge and form two ridges 93 and 95 extending from the mesial to the distal on the buccal and lingual sides of the occlusal surfaces, the ridges replacing the cusps and being massive in design. The buccal and lingual ridges are united by the massive bucco-lingual ridge 96 on the occlusal surface of each molar, the bucco-lingual ridge crossing the occlusal surfaces in a bucco-lingual direction, slightly mesial to the bucco-lingual axis of the occlusal surfaces.

Figure 7:
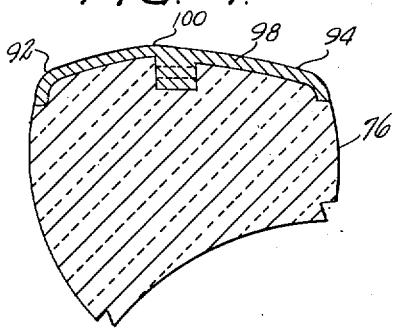
Figure 7 is a transverse cross sectional view taken on line 7—7 of Figure 4 and illustrating more particularly the bucco-lingual ridge formed on the occlusal surface of the first molar.

The point of eminence for the occlusal surfaces of the second bicuspid and the first and second molars, is located on the bucco-lingual ridges, 82, 96 and 98, on the mesial-distal center of the bucco-lingual ridge slightly buccal to the mesial-distal axis for the occlusal surfaces. From this point of eminence 100, as seen in Figure 7, the occlusal surfaces slope downward in all directions, rapidly mesially and distally to form the mesial and distal sulci systems, and slightly buccally and lingually to form the crest of the buccal and lingual ridges.

Figure 8:
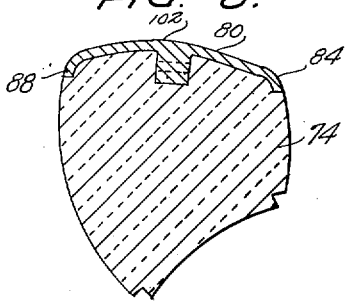
Figure 8 is a transverse cross sectional view taken on line 8—8 of Figure 4 and illustrating more particularly the formation of the occlusal surface of the first bicuspid of the posterior teeth of the lower denture.

The occlusal surface of the lower first bicuspid 74 is different from that of the second bicuspid and first and second molars, inasmuch as the [point of eminence 102 on the tip of the buccal ridge 84, as seen in Figure 8, is more to the lingual] *point of eminence 102 on the tip of the bucco-lingual ridge 80 as seen in Figure 8 is more to the lingual* side. The bucco-lingual ridge 80 crosses the surface in a bucco-lingual direction from the high point extending downward to the center of the surface, where it is crossed by the connecting sulcus 104, as seen in Figure 4, the sulcus extending mesially and distally to unite the two sulci systems 106 and 108.

It will be noted that the high point on the bucco-lingual ridges of the occlusal surfaces of the bicuspids and molars of the lower posterior teeth are higher than any other point on the occlusal surfaces. The specific formation of the bucco-lingual ridges, with the point of eminence of the occlusal surface formed thereon, assists in giving a downward slanting direction to the lateral movement of the mandible. The bucco-lingual ridges, together with the buccal and lingual ridges and the massive cusps on the first and second bicuspids pass freely through the arc K—L, in Figure 11, the crests or tips of the multi-cusps on the upper bicuspids and molars being located on the arc at all directions and at all angles. The multi-cusp teeth of the upper arch meet the massive ridges and cusps of the lower teeth in tip to tip multiplicity of contact, which presents greater mincing effect to the masticating action with less harm to the underlying soft mucous tissues and bony supporting structures. The contact, in lateral motion, between the occlusal surfaces of the posterior teeth will be a sliding and a somewhat guiding contact to the extent that the lateral mandibular motion has imposed upon it a downward slanting direction but no other. This contact will obviate the harsh, crushing and interlocking meeting of the more or less flat inclined planes of the cusps of the conventional teeth. The inclined planes of the cusps of conventional teeth present great interference to lateral mandibular motion and in addition tend to impose direction along certain definite paths. Of course, rounded surfaces can pass more readily over each other than can more or less flat surfaces and since the contact surfaces of the teeth of this invention are rounded, and since there is a multiplicity of contact between the cusps and ridges of the opposing dentures, the mandibular motions will be greatly freed of impediments or obstacles.

It will be noted that the bucco-lingual ridge 98, as seen in Figure 11, is substantially arcuate in cross section, the point of eminence 100 for the occlusal surface being on the bucco-lingual ridge slightly mesial to the bucco-lingual axis of the occusal surface. The bucco-lingual ridge does not form or define any cusps and is not on a true arc, as seen in Figure 8, in order to form the point of eminence 102.

The first and second bicuspids 74 and 72 have the distinct buccal and lingual cusps 88, 84, 86 and 90. The cusps are blunt and massive and not high or sharp, with the lingual cusps being much smaller than the buccal cusps. Each tooth's occlusal surface is crossed in a bucco-lingual direction by the bucco-lingual ridges.

In the denture 12, the first and second biscuspids 74 and 72 of the posterior teeth are so arranged that the lingual cusps 84 and 86 are free from contact with the multi-cusp occlusal surfaces of the first and second posterior teeth of the upper set, when the mandible is in anterior-posterior or lateral motion. The contact of the first and second bicuspids with the upper posterior teeth is on the buccal cusps and the bucco-lingual ridge of the second biscuspid. These blunt cusps and the massive ridge bear the weight of contact with the multi-cusp upper posterior teeth at many points and permit the anterior, posterior and lateral excursions of the mandible with a minimum [of cuspal interference. The buccal ridge 92 is much larger than the lingual ridge 94 and occu-] *of cuspal interference. The buccal ridge 93 is much larger than the lingual ridge 95 and occu-*pies a position of slightly greater height. The buccal and lingual ridges are made in more or less the shape of a segment of a cylindrical body from the mesial and distal aspects. These massive buccal and lingual ridges, of more or less cylindrical shape, when in contact with the multi-cusps occlusal surfaces of the upper posterior teeth, present a multiplicity of contact, which reduces cuspal interference to a minimum in the anterior, posterior and lateral excursions of the mandible. The massive bucco-lingual ridges of the second bicuspid and first and second molars, on which are the high points of these occlusal surfaces, presents a slanting downward direction to the motion of the mandible in its lateral excursions and assists greatly in anterior and posterior movements.

The first bicuspids, the second bicuspids, and the first and second molars have two distinct sulci systems, mesial and distal. The sulci systems of the first bicuspids are different from those of the three other teeth. In the first bicuspids, the bucco-lingual ridge 80 is crossed in a mesial-distal direction by the connecting sulcus at the lowest point on the ridge, the sulcus falling rapidly downward to the mesial and distal to form the mesial and distal fossa. A mesial-lingual and a mesial-buccal sulci is defined by the fossa and a distal-lingual and a distal-buccal sulci is defined, the sulci descending slowly to their termination at the distal and mesial borders of the occlusal surfaces. The occlusal surface of the first bicuspid presents only two fossae, a distal fossa, and a mesial fossa, the sulci from their source descending downward in all parts of their course.

The second bicuspid and the first and second molars have two distinct sulci systems on each occlusal surface, the sulci systems being separated by the bucco-lingual ridge. The sulci systems are alike except that the distal systems are somewhat reduced in size, so that a description of one should be sufficient for all. For example, the mesial sulci system of the occlusal surface of the first molar is as follows:

The sulci system takes its origin from two points, one buccal to the mesial-distal axis of this surface, the other lingual to it, at the junctions of the bucco-lingual ridge with buccal and lingual ridges. From these points, the sulci extend downward and mesially to the mesial-distal axis where they form a junction, just lingual to the axis (the junction being the mesial-central fossa). This junction is the inception point for a single sulcus to the mesial and downward to form the mesial fossa, which defines two sulci downward and to the mesial-lingual and mesial-buccal to their termination at the mesial border. The sulci system from its origin to its termination always pursues a downward course, the sulci forming four fossae on the whole occlusal surface as follows, the mesial fossa, the mesial-central fossa, the distal-central fossa and the distal fossa.

Thus, in the posterior teeth, the occlusal surfaces are formed, so that there are four fossae on the occlusal surface of each tooth, except the lower first bicuspid has two fossae, and the bucco-lingual ridges are formed, so that the high point of eminence is in the center of the ridge and the point of eminence defines the highest point on the occlusal surfaces of the bicuspids and molars. The buccal and lingual ridges are formed, so that their crests are contoured throughout their entire lengths, or the crests being in a straight line and contoured slightly only at the ends. The sulci pass downwardly throughout their course from inception to termination.

Figure 14:
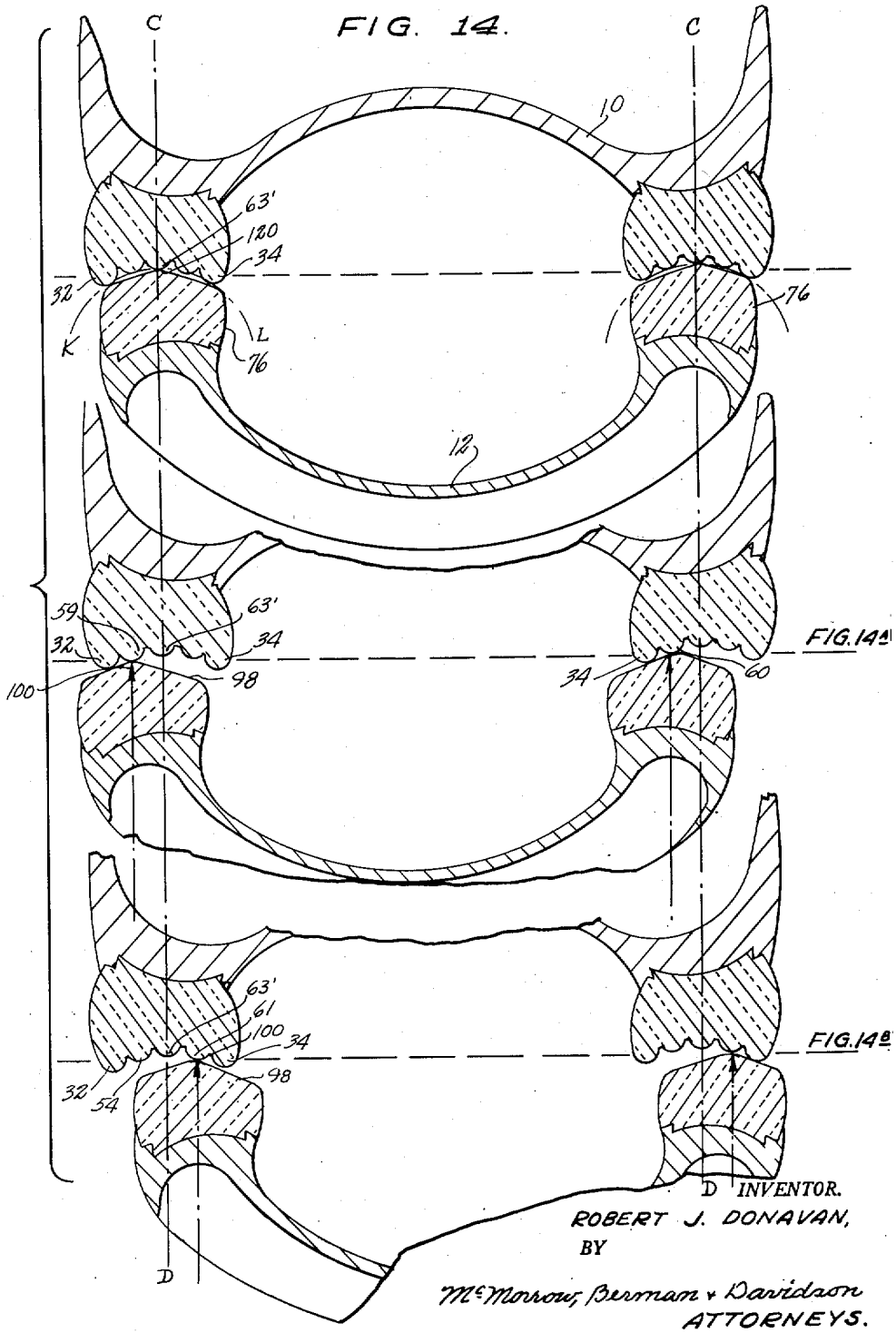

In Figures 14, 14a and 14b, the dentures are illustrated, somewhat diagrammatically, in the various mandibular movements. Of course, the movements of the mandible vary in each person and are governed and given their course by things and conditions that are peculiar to each individual. Thus, muscles, fossa bone structure, tissue tolerance and many other factors enter into the initiation and determinance of the course and movement of the mandible. Every individual has anterior, posterior and lateral movement of the mandible and all dentures are constructed, with the movements of the mandible in mind.

In Figure 14, the upper denture plate 10 and lower denture 12 are illustrated in centric position, the molars 76 on each side of the posterior teeth being illustrated, with the bucco-lingual ridge exploited. The molars of the upper denture are illustrated in cross section. The dentures are depicted in centric occlusion parallel to lines CD and CD which illustrate this position in all of [the figures. At 100, the point of eminence on the] *the figures. At 120, the point of eminence on the* bucco-lingual ridge of the molars of the lower posterior teeth is illustrated, the point resting directly under one of the mechanical cusps of the upper molars. Thus, in Figure 14, the point of eminence is directly in vertical alignment and underlies the crest or tip of the mechanical cusps 63', so that the point E overlies the point of eminence of the bucco-lingual ridge, the arc DEF transversely intersecting the point of eminence at its center. The three central mechanical cusps 62, 63 and 63', as seen in Figure 12, are constructed on each molar so that the bucco-lingual ridge on the lower molars must be in contact with one or more of them at all times in centric relation. The bucco-lingual ridge of massive proportions must be large enough to span or almost span the distance between the cusps on the upper molars. The larger and more evenly contoured the bucco-lingual ridge is, the more smooth will be the mandibular movements. The arc KL illustrates the plane in which the crests of the upper cusps lie. Each of the upper molars is formed with 11 cusps, which ideally should all contact the ridges of the lower molars but, due to imperfection in skill and materials, usually only 8 of the cusps will contact the ridges of the lower molar, but, in any event, a multiplicity of cuspal and ridge contact is provided, whereby the occlusal surfaces can pass freely over each other without greatly disturbing interference in mastication.

In anterior-posterior movements, the ridges of the lower teeth would pass freely back and forth contacting the multi-cusps within the arc KL. However, anterior motion would be disturbed the instant the incisal edges of the lower anterior teeth began to mount on the lingual surface of the upper anterior teeth. At this point, balanced occlusion is lost and malocclusion begins and only the retention of the dentures against the underlying mucous tissue holds them in place. Posterior occlusal contact is lost at this point, as the general rule.

In Figure 14a, the mandible is depicted in right [lateral movement, the point 120 or point of emi-] *lateral movement, the point 100 or point of eminence* on the bucco-lingual ridge being moved to the right to gain contact with the buccal mechanical cusps and possibly to the conventional buccal cusps. Of course, the latter movement is dependent upon the range of lateral movement and the range of lateral and anterior-posterior movement varies greatly in different individuals. On the opposite side of the dentures, the point [of eminence 120 is moved to the right to contact] *of eminence 100 is moved to the right to contact* the lingual mechanical cusps 60 and the lingual [conventional cusps 54. The whole ridge surfaces] *conventional cusps 34. The whole ridge surfaces* of the lower posterior teeth will be in contact with the crests or tips of the cusps of the upper teeth, the degree of contact being in accordance with the perfection of the tooth assembly set-up.

This gives a multiplicity of contact which permits movement with great freedom and balanced occlusion in the movements. At the same time that the lateral movement is carried on, the crest of the bucco-lingual ridge is in contact with the upper cups and will guide the mandible along the arc A—B, in which the crests of the upper cusps are located, the mandible being guided to a downward slanting direction in the lateral movement.

In Figure 14b, the left lateral excursion of the mandible is illustrated, the action being opposite to the illustration in Figure 14a, since the point of eminence would contact the opposite cusps, as seen clearly in the figure.

The bucco-lingual ridge on the occlusal surface of the lower bicuspids and molars is an outstanding and important feature of the formation of the occlusal surfaces of the posterior lower teeth, inasmuch as its function is to aid the buccal and lingual ridges of the lower posterior teeth in sliding over the tips of crests of the cusps of the upper teeth, when the mandible is in lateral motion. The ridge performs this office, due to its abundance of contact with the mechanical cusps and the four conventional cusps. In anterior and posterior motion of the mandible, the ridge because of its massive construction slides over the tips or crests of the upper mechanical cusps with great ease, being too large and massive to fall in the spaces between them and cause interference. Moreover, these occlusal surfaces give extreme freedom to anterior and posterior motion of the mandible, as far as the upper anterior teeth will permit. Interference in anterior and posterior motion in the mandible is due mostly to the lower incisors and cuspids passing forward and downward over the lingual surfaces of the six upper anterior teeth, causing the posterior teeth to lose occlusal contact with each other.

Thus, it can be seen that the multi-cusp teeth will increase masticating efficiency, since a multiplicity of cusps will be formed on the occlusal surfaces of the upper posterior teeth and complementary ridges will be formed on the occlusal surfaces of the lower posterior teeth, the ridges mating in sliding and free engagement with the cusps on the occlusal surfaces of the upper posterior teeth. The ridges on the lower posterior teeth take the place of cusps and perform the same masticating function and additional functions, such as increasing the ease of mandibular movements.

The following features are of extreme importance:

A. Multiplicity of cusps on the occlusal surfaces of the upper posterior teeth and modified bucco-lingual ridges.

B. Modified bucco-lingual ridges on lower teeth for modifying ridge structures.

C. Sulci systems of the occlusal surfaces of the lower teeth, differing from other sulci systems and the fact that from their source they extend downward in all parts of their course.

D. Unique mechanical devices upon the occlusal surfaces of the posterior upper and lower teeth to increase masticating efficiency.

E. The unique mechanical device upon the occlusal surfaces to reduce interference with mandibular motions.

F. A minimum of guided direction imposed upon mandibular motion, the imposed guided direction being only that of a downward slanting direction to lateral movement.

G. The natural appearance of the teeth from any reasonable area of visibility.

It is to be particularly noted that the bucco-lingual ridges are semi-cylindrical in shape and the ridges extend from buccal to lingual surfaces in an arc mesially or distally or straight across as the size and shape of the occlusal surface will permit. The bucco-lingual ridge of the lower teeth is massive in design extending straight across the occlusal surfaces and dividing the surfaces into a mesial and a distal area, in which are the unique sulci systems. The straight buccolingual course of the ridge and its point of eminence for the lower occlusal surfaces aids in the proper mastication and in the movement of the lower denture on the upper denture.

Figure 9:
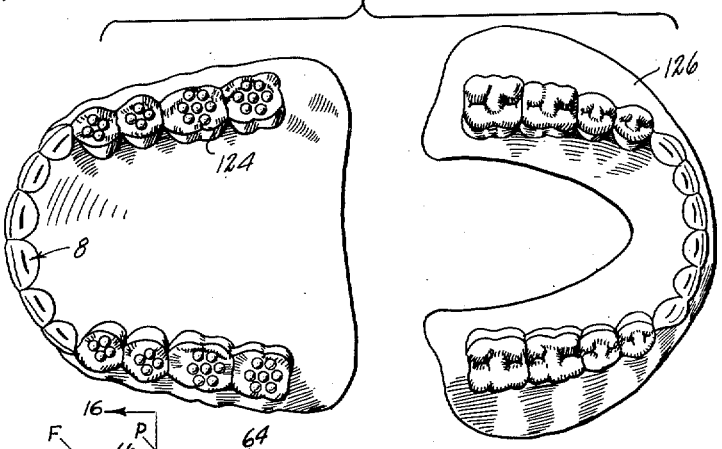
Figure 9 is an occlusal surface view of an upper and a lower artificial denture of modified form in which the occlusal surfaces are formed with armoured cusps.

In Figure 9, modified denture structure is provided, the occlusal surfaces of the posterior upper and lower teeth being armoured or capped. The purpose of capping or armouring the cusp occlusal surfaces and the ridged occlusal surfaces on the upper and lower posterior teeth is to prevent or to reduce to a minimum the wearing away of the occlusal surface, thereby preventing loss of vertical dimension.

The occlusal surfaces 124 of the posterior teeth of the upper denture are formed and constructed in a manner similar to the construction of the denture, in Figure 1, except that the cusps are covered with metal armour. [The occlusal surfaces may be formed and then covered with a melted metal, which, after setting, would have a wear surface, similar to the occlusal surface of the denture in Figure 1. Or, the porcelain crown may be formed plain and the armoured cap may be configured, so as to have the cusps formed thereon.] The occlusal surfaces of the posterior teeth of the lower denture 126 are formed with the ridge structure and the sulci, as in Figure 1, except that the ridge and sulci are covered with an armour.

It can thus be seen that the occlusal surfaces of the upper posterior teeth are especially formed with the cusps, arranged and constructed as aforedescribed, and the occlusal surfaces of the lower posterior teeth are especially formed with the ridge and sulci systems, so that the occlusal surfaces engage in sliding contact and obtain proper mastication, the loss of pressure, such as found in natural teeth, being compensated for by the cutting and grinding action of the mating occlusal surfaces of the upper and lower teeth. Also, the particular formation of the bucco-lingual ridge and especially, the point of eminence thereon, permits proper mandible motion, without any interference and especially, without imposing any strain or wear on the gum tissues and causing improper seating of the plates.

While the foregoing invention has been especially described and illustrated as related to dentures or full plates, it is apparent that the same can be used to full advantage with bridges or individual replacement teeth.

Having thus described this invention, what is claimed is:

1. The combination of upper and lower dentures, each having artificial posterior teeth, the posterior teeth of the upper denture having semi-globular cusps formed on their occlusal surfaces and the posterior teeth of the lower denture having bucco-lingual ridges extending across the occlusal surfaces and adapted to span the cusps on the upper teeth.

2. The combination of upper and lower dentures, each having artificial posterior teeth, the posterior teeth of the upper denture having buccal and lingual cusps and semi-globular mechanical cusps arranged between the buccal and lingual cusps, the mechanical cusps on the occlusal surfaces of the premolars and molars of the upper denture lying in parallel planes parallel to the anterior-posterior direction, and the posterior teeth of the lower denture having bucco-lingual ridges formed on their occlusal surfaces and adapted to span the mechanical cusps on the upper teeth, said ridges defining distinct sulci systems on the occlusal surface of each lower tooth.

3. The combination of upper and lower dentures, each having artificial posterior teeth, the posterior teeth of the upper denture having buccal and lingual cusps and semi-globular mechanical cusps on the occlusal surfaces of the premolars and molars of the upper denture lying in parallel planes parallel to the anterior-posterior direction, and the posterior teeth of the lower denture having bucco-lingual ridges formed on their occlusal surfaces and adapted to span the mechanical cusps on the upper teeth, said ridges defining distinct sulci systems on the occlusal surface of each lower tooth, said sulci systems lying mesially and distally of the bucco-lingual ridge and originating from two points, one of said points being buccal to the mesial-distal axis of the occlusal surface and the other lingual to the mesial-distal axis.

4. The combination with upper and lower dentures, each denture having artificial posterior teeth, the posterior teeth of the upper denture having buccal and lingual cusps and semi-globular mechanical cusps arranged between the buccal and lingual cusps, and the posterior teeth of the lower denture having massive bucco-lingual ridges formed on their occlusal surfaces, the ridges each having a highest point which points define the points of eminence of the occlusal surfaces of the lower teeth.

5. The combination with upper and lower dentures, each denture having artificial posterior teeth, the posterior teeth of the upper denture having buccal and lingual cusps and semi-globular mechanical cusps arranged between the buccal and lingual cusps, and the posterior teeth of the lower denture having massive bucco-lingual ridges formed on their occlusal surfaces, the ridges having a highest point which defines the point of eminence of the occlusal surfaces of the lower teeth, the point of emience of the occlusal surfaces of the lower teeth being above the buccal and lingual ridges of the teeth and being rounded for contact with the tips of the mechanical cusps on the upper teeth.

6. The combination with upper and lower dentures, each denture having artificial posterior teeth, the posterior teeth of the upper denture having armoured mechanical semi-globular cusps formed on their occlusal surfaces, and the posterior teeth of the lower denture having armoured lingual and buccal cusps and armoured bucco-lingual ridges adapted to span the mechanical cusps of the upper teeth during mandibular motion.

7. In a group of artificial posterior teeth including complementary upper and lower teeth having meeting occlusal surfaces, the construction in which each upper tooth has its occlusal surface transversely concave in a buccal-lingual direction and has buccal and lingual cusps and spaced apart mechanical cusps of rounded shape disposed between said buccal and lingual cusps, and each lower tooth has its occlusal surface transversely convex in a buccal-lingual direction and has a buccal and a lingual ridge and a transverse ridge extending between the buccal and lingual ridges between the mesial and distal borders of the complementary occlusal surface, the ridges on each lower tooth having a width at least as great as the distance between adjacent mechanical cusps on the complementary upper tooth.

8. In a group of artificial posterior teeth including complementary upper and lower teeth having meeting occlusal surfaces, the construction in which each upper tooth has its occlusal surface transversely concave in a buccal-lingual direction and has buccal and lingual cusps and mechanical cusps of rounded shape spaced apart in both a buccal-lingual and a distal-mesial direction between said buccal and lingual cusps, and each lower tooth has its occlusal surface transversely convex in a buccal-lingual direction and has a buccal and a lingual ridge and a transverse ridge extending between the buccal and lingual ridges between the mesial and distal borders of the complementary occlusal surface, the ridges on each lower tooth having a width at least as great as the distance between adjacent mechanical cusps on the complementary upper tooth.

9. In a group of artificial posterior teeth including complementary upper and lower teeth having meeting occlusal surfaces, the construction in which each upper tooth has its occlusal surface transversely concave in a buccal-lingual direction and has buccal and lingual cusps and spaced apart mechanical cusps of rounded shape disposed between said buccal and lingual cusps, and each lower tooth has its occlusal surface transversely convex in a buccal-lingual direction and has a buccal and a lingual ridge and a transveres ridge extending between the buccal and lingual ridges between the mesial and distal borders of the complementary occlusal surface, the ridges on each lower tooth having a width at least as great as the distance between adjacent mechanical cusps on the complementary upper tooth, the buccal cusp on each upper tooth having a greater eminence than any other cusp on the [same tooth and the lingual ridge on each lower tooth having a greater eminence than the corresponding buccal ridge.] *same tooth and the buccal ridge on each lower tooth having a greater eminence than the corresponding lingual ridge.*

10. In a group of artificial posterior teeth including complementary upper and lower teeth having meeting occlusal surfaces, the construction in which each upper tooth has its occlusal surface transversely concave in a buccal-lingual direction and has buccal and lingual cusps and spaced apart mechanical cusps of rounded shape disposed between said buccal and lingual cusps, and each lower tooth has its occlusal surface transversely convex in a buccal-lingual direction and has a buccal and a lingual ridge and a transverse ridge extending between the buccal and lingual ridges between the mesial and distal borders of the complementary occlusal surface, the ridges on each lower tooth having a width at least as great as the distance between adjacent mechanical cusps on the complementary upper tooth, the buccal cusp on each upper tooth having a greater eminence than any other cusp on [the same tooth and the lingual ridge on each lower tooth having a greater eminence than the corresponding buccal ridge with the point of max-] *the same tooth and the buccal ridge on each lower tooth having a greater eminence than the corresponding lingual ridge with the point of maxi*mum eminence on each lower tooth located on the buccal-lingual ridges of such tooth.

ROBERT J. DONAVAN.

REFERENCES CITED

The following references are of record in the file of this patent or the original patent:

UNITED STATES PATENTS

| Number | Name | Date |
|---|---|---|
| 1,367,477 | Homer | Feb. 1, 1921 |
| 1,987,712 | Schroder et al. | Jan. 15, 1935 |
| 2,548,956 | Dickson | Apr. 17, 1951 |
| 2,549,636 | Raber | Apr. 17, 1951 |

FOREIGN PATENTS

| Number | Country | Date |
|---|---|---|
| 17,263 | Great Britain | Aug. 28, 1901 |